United States Patent
Ouchi et al.

(10) Patent No.: US 6,641,652 B2
(45) Date of Patent: Nov. 4, 2003

(54) INK COMPOSITION FOR INKJET RECORDING AND INKJET RECORDING PROCESS

(75) Inventors: Akemi Ouchi, Ibaraki (JP); Tsutomu Maekawa, Ibaraki (JP); Atsushi Kakuta, Ibaraki (JP)

(73) Assignee: Hitachi Printing Solutions, Ltd., Ebina (JP)

(*) Notice: Subject to any disclaimer, the term of this patent is extended or adjusted under 35 U.S.C. 154(b) by 0 days.

(21) Appl. No.: 09/815,339

(22) Filed: Mar. 23, 2001

(65) Prior Publication Data

US 2001/0045175 A1 Nov. 29, 2001

(30) Foreign Application Priority Data

Mar. 24, 2000 (JP) .......................................... 2000-083401

(51) Int. Cl.[7] .............................................. C09D 11/02
(52) U.S. Cl. ..................................... 106/31.6; 106/31.86
(58) Field of Search ............................... 106/31.6, 31.86

(56) References Cited

U.S. PATENT DOCUMENTS

| | | | | | |
|---|---|---|---|---|---|
| 5,180,425 | A | * | 1/1993 | Matrick et al. | 106/31.58 |
| 5,955,515 | A | * | 9/1999 | Kimura et al. | 106/31.13 |
| 5,997,623 | A | * | 12/1999 | Lin | 106/31.58 |
| 2001/0000253 | A1 | * | 4/2001 | Matzinger | 523/160 |

* cited by examiner

*Primary Examiner*—Mark L. Bell
*Assistant Examiner*—Veronica F. Faison
(74) *Attorney, Agent, or Firm*—McGinn & Gibb PLLC

(57) ABSTRACT

An ink composition for use in an on-demand inkjet printer capable of printing on plain paper at a recording rate of 10 ips or higher, which ink composition comprises at least a pigment and non-pigment components including at least water and a thickening agent and shows a weight loss ratio at 25° C. and 60 RH % for 30 minutes of 5 to 25% based on the total weight of the ink. Also disclosed is an on-demand inkjet recording process using the ink composition.

18 Claims, 3 Drawing Sheets

INK COMPOSITION FOR INKJET RECORDING AND INKJET RECORDING PROCESS

FIELD OF THE INVENTION

This invention relates to an inkjet ink composition for use in an inkjet recording apparatus for conducting recording on plain paper at a high speed.

BACKGROUND OF THE INVENTION

As an ink composition for use in inkjet recording, there have so far been widely used water-soluble liquid ink compositions. However, when printing is conducted on plain paper popularly used in offices such as copying paper, the printed ink spreads along fibers of the paper, thus shape of dots becoming irregular to generate so-called blurring which deteriorates quality of printed products.

Various improvements have so far been made in order to remove blurring and improve drying properties. For example, Japanese Patent Publication No. 34992/1985 proposes to reduce surface tension of ink and enhance drying properties of ink by using a large quantity of a surface active agent. Japanese Patent Laid-Open No. 108271/1983 describes a method of recording by using a hot-melt ink composition containing a substance which is solid at room temperature, such as wax. Further, U.S. Pat. Nos. 4,391,369 and 4,484,948 describe an ink composition which provide good printing quality regardless of the properties of paper.

It has also been attempted to improve ink compositions themselves. As a water-soluble liquid ink composition, Japanese Patent Laid-Open No. 233781/1990 describes a recording liquid of a water-soluble medium and a dye containing as a humectant a water-soluble organic solvent composed of diethylene glycol, glycerin and polyethylene glycol in a content of 4 to 20 wt %. Japanese Patent Publication No. 33110/1995 discloses an ink containing as necessary components a dye, a volatile solvent and a solid substance having a molecular weight of 300 or more. Japanese Patent No. 2,516,218 discloses a recording method of printing on paper of 10 or more in Stöckigt sizing degree using a composition containing a dye, a wetting agent and water and having a dynamic surface tension and a viscosity the sum of which is 42 to 49. Japanese Patent No. 2,801,295 discloses a method of recording on a recording medium of 0 to 15 in Stöckigt sizing degree by optimizing the dye concentration Further, Japanese Patent Laid-Open No. 330666/1998 discloses to use a recording medium of 10 or more in Stöckigt sizing degree for evaporation of aqueous inks. Japanese Patent No. 2,529,154 shows an inkjet composition using a non-aqueous solvent showing an evaporation rate of 1/10 that of butyl acetate.

On the other hand, in order to improve weatherability of printed products, pigments are generally used as colorants of inks for use in various printers such as laser printers, melt transfer printers, liquid inkjet printers and solid inkjet printers.

As to pigment inks, many reports have been made by, for example, Japanese Patent Laid-Open Nos. 37278/1991, 339871/1992, 16343/1993, 105832/1993, 49400/1994, 228479/1994, 228480/1994, 306319/1994, 109432/1995, 196968/1995, 278477/1995, 306319/1995, 316479/1995, 331141/1995 and 295836/1996.

However, most of popularly used recording liquids for inkjet recording have been recording liquids using an aqueous medium and a dye. For, in case where pigments are used, it is difficult to combine constituents so as to stably keep the pigments in a dispersed state, and thus keeping the recording liquids for a long time is difficult.

As is different from those recording liquids in which dyes soluble in an aqueous medium are used, recording liquids using pigments are liable to cause clogging of a nozzle pore of a recording head since the pigments are insoluble in an aqueous medium and therefore in a solid state, thus a large quantity of humectant such as polyalkylene glycol or glycerin becoming necessary.

For example, Japanese Patent Laid-Open No. 157464/1991 discloses a recording liquid using a pigment, in which a humectant is used in an amount of preferably 30 to 80 parts per 100 parts by weight of water. It has also been tried to add a large amount of a humectant in order to prevent aggregation of pigments, but such addition causes an increase in viscosity of the recording liquid so much that ejecting properties of the liquid is decreased. In order to improve drying resistance at the tip of a pen without increasing viscosity, Japanese Patent Publication No. 21250/1994 discloses an aqueous pigment ink containing trimethylpentanediol monoisobutylate and ethylene glycol monobutyl ether. Although this Japanese Patent Publication No. 21250/1994 discloses a recording liquid showing a high fixing rate by incorporating dialkyl ether, every Example therein shows an ink viscosity of as low as about 3 mPa·s. Japanese Patent Laid-Open No. 209046/1996 describes that a recording liquid containing 8 to 15% by weight of a water-soluble organic solvent is preferred, said solvent containing as a humectant polyethylene glycol having a molecular weight of 100 to 500. However, it does not describe specific viscosity values and materials to be recorded. In addition, Japanese Patent Laid-Open No. 199807/1999 discloses a recording liquid which contains 1.5 to 3% by weight of a water-insoluble or slightly water-soluble colorant and 2 to 7.5% by weight of polyalkylene glycol having a weight average molecular weight of 2000 to 20000. Japanese Patent Laid-Open No. 228884/1999 describes an ink comprising a pigment, a humectant and an aqueous medium, which is characterized in that the amount of residual water is 0.5 to 10 g per 100 g of the ink. However, it does not describe the amount of initial water, and does not refer to printing quality with respect to ejecting properties.

Japanese Patent Publication No. 37834/1985 discloses a recording liquid using in combination polyalkylene glycol of 150 to 350 in an average molecular weight and polyalkylene glycol of 400 to 750 in an average molecular weight mainly for obtaining a recording liquid having excellent ejection stability, ejection response and continuously recording ability. However, it does not describe other advantages, nor to use polyalkylene glycol having a high molecular weight.

Further, in the above-described publication, no consideration is given about improvement of jet stability and quality of printed produces by the viscosity-increasing effect of polyethylene glycol and glycol ether in aqueous inks. A marked water viscosity-increasing effect is obtained by polyethylene glycol and/or glycol ether, and the use of only polyhydric alcohol humectants such as glycerin fails to attain the main object of the present invention. That is, function of polyethylene glycol in the ink composition of the present invention is greatly different from that conventionally used as humectant.

When used for printing, aqueous inks are difficultly printed on recording materials with no ink-absorbing properties and, even when paper for exclusive use is used, a large-sized ink drying apparatus is required. In addition, since highly fine printing is difficult due to blurring problem which sets a limit to resolving power, application of such inks is limited. In some cases, solvent inks are used in view of their quick-drying advantage. However, they are not desirable due to the problems of combustion and environmental pollution. Hot-melt oily inks enable high speed printing but, due to the essential properties of the inks, printed dots have a thickness of about 10 to 20 $\mu$m at the thickest, and hence they provide such a poor durability that it has been difficult to obtain enough reliability of printed products.

Inkjet recording system using organic pigments as colorants have much more advantages than inkjet recording system using dyes especially with respect to weatherability. Hence, the inkjet recording system is expected to be applied not only printers such as OA instruments, home printers and facsimiles but other uses such as outdoor or indoor posters, large-sized signboards, decoration of cars, glasses, elevators, walls and buildings, and printing of cloths. However, as has been described hereinbefore, the problem of lack of highly relaiable printing quality has been a bottleneck to commercialization of the system.

SUMMARY OF THE INVENTION

An object of the present invention is to provide an ink composition for use in an inkjet printer capable of giving recorded products of good quality on plain paper through high-speed drying, and a method of printing the ink composition.

Another object of the present invention is to provide a pigment ink composition for a high speed inkjet printer, which shows enough excellent ejecting stability to jet through fine nozzles in the form of ink droplets.

A still other object of the present invention is to provide a recording process suitable for high speed recording.

Other objects and effects of the invention will become apparent from the following description.

The above-described objects of the present invention have been achieved by providing the following ink compositions and printing processes.

(1) An ink composition for use in an on-demand inkjet printer capable of printing on plain paper at a recording rate of 10 ips or higher, which ink composition comprises at least a pigment and non-pigment components including at least water and a thickening agent and shows a weight loss ratio at 25° C. and 60 RH (relative humidity) % for 30 minutes of 5 to 25% based on the total weight of the ink (2) The ink composition as described in item (1) above, wherein said non-pigment components comprises:

at least one of 7.5 to 40% by weight of a polyethylene glycol having an average molecular weight of 600 to 6,000 and 1 to 10% by weight of a polyethylene glycol having an average molecular weight of 20,000 to 70,000 as a thickening agent;

0 to 30% by weight of at least one of an ethylene glycol ether and a propylene glycol ether; and 0 to 30% by weight of glycerin.

(3) The ink composition as described in item (1) or (2) above, having a viscosity at 25° C. of 5 to 15 mPa·s and a surface tension of 30 to 55 mN/m.

(4) An on-demand inkjet recording process comprising:
recording an image on plain paper by ejecting an ink composition at a recording rate of 10 ips or higher,
wherein said ink composition is as described in item (1) above.

(5) The process as described in item (4) above, wherein wherein said non-pigment components comprises:

at least one of 7.5 to 40% by weight of a polyethylene glycol having an average molecular weight of 600 to 6,000 and 1 to 10% by weight of a polyethylene glycol having an average molecular weight of 20,000 to 70,000 as a thickening agent;

0 to 30% by weight of at least one of an ethylene glycol ether and a propylene glycol ether; and 0 to 30% by weight of glycerin.

(6) The process as described in item (4) or (5) above, wherein said ink composition has a viscosity at 25° C. of 5 to 15 mPa·s and a surface tension of 30 to 55 mN/m.

(7) The process as described in any one of items (4) to (6) above, wherein said plain paper has a Stöckigt sizing degree of 55 or less.

DETAILED DESCRIPTION OF THE INVENTION

Figure 1:
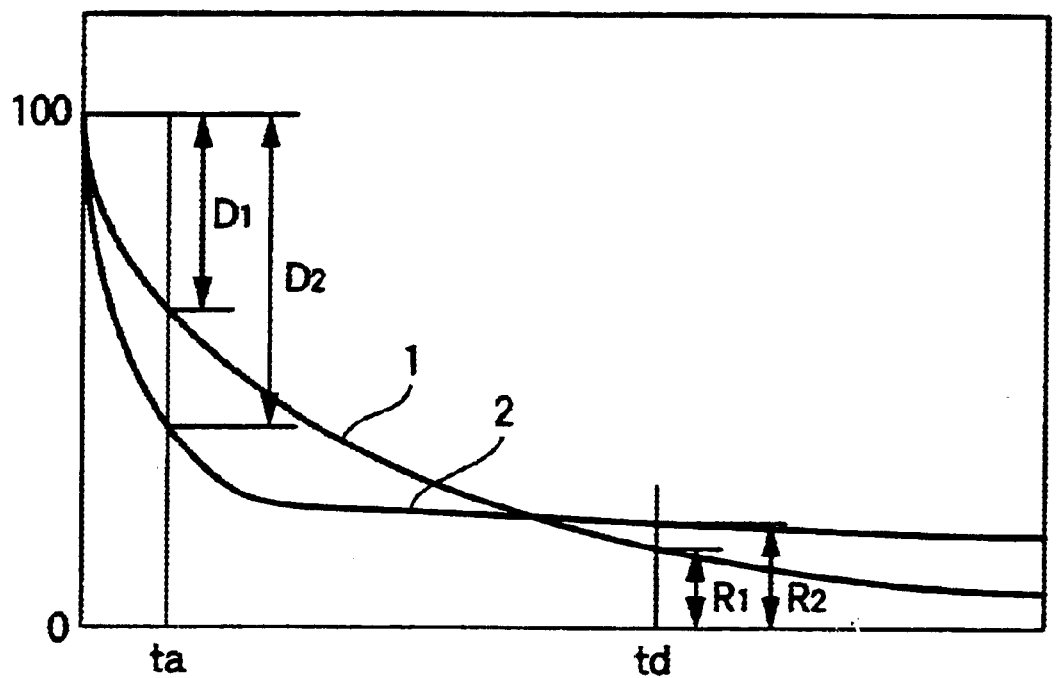
FIG. 1 is a graph showing the concept of weight loss of an ink composition.

Printing rate of the printers for which the ink of the invention is adapted is markedly higher than in the conventional inkjet recording. A recording rate of as fast as 10 ips (inch/s) in terms of relative rate between nozzle and paper is preferred. Recording at a high rate requires ink droplets to be set immediately after their deposition on a recording medium and, if degree of set is insufficient, there would result such fatal deficiencies as that the deposited ink droplets transfer to the backside of other sheet of paper superposed thereon or adhere to carrying rolls in the recording apparatus, and that dots are recorded in an irregular form. To realize a recording rate of 10 ips requires to complete fixing within, for example, about 1 s after recording That is, the present invention permits to substantially handle (for example, hand-touchable) within about 1 s.

As recording heads or recording methods for on-demand inkjet recording system using piezoelectric elements, there are many types such as line recording, serial recording and transfer (shuttle) recording. The invention is not limited only to these recording types. In any type of recording, the invention is applied to the step where a nozzle or nozzles and paper (recording medium) move at a relative rate of 10 ips or more. For example, in a step where a head is fixed and only paper moves, the paper-moving rate (paper-carrying rate) is the relative rate as in line recording and, in a step where a head moves in a vertical direction with respect to the paper-moving direction to conduct serial recording, followed by intermittently carrying paper, the head-moving rate (carriage rate) is the relative rate. In case where recording is conducted on paper provided around a rotating drum, or where transfer recording is conducted by once conducting recording on a drum, then transferring the recorded product onto paper, the relative rate is understood as a position-changing rate between the moving paper or drum and the nozzle.

In any of the above-described cases, recording rate directly relates to nozzle-ejecting frequency and resolution of recorded products. For example, the paper-carrying rate in line recording or the head-moving rate in serial recording, i.e., recording rate V is represented by the formula: V=f×R, wherein F represents ink droplet-ejecting frequency, and R represents resolution of recorded products.

In the conventional recording conducted at a rate of 5 ips or less (usually 1 ips or less), many ink compositions having so far been reported may be used as such. In contrast, the invention is utilized with advantages in a high speed recording of at least 10 ips. In order to more effectively utilize the high speed recording of the invention, it is possible to add a step such as a heating step or a drying step. However, the invention is characterized in that it can realize enough practical printing properties without the drying or heating step.

Weight loss of the ink composition, which is the characteristic point of the invention, is described below.

In inkjet recording, various techniques have been employed to attain highly drying properties of prints and prevent clogging in nozzles due to drying at the same time. For example, clogging of the nozzle can be prevented by mixing wish a solvent having a high boiling point, called wetting agent, in a proper amount so as to remain after a main solvent (e.g., water) is evaporated. That is, it has been well known in this field to aquire desired properties by properly controlling evaporation rate.

However, as one of other many difficulties in inkjet printing, there has often been experienced the phenomenon that sufficient printing can not be conducted immediately after initiation of printing due to delayed ejection. Regarding this phenomenon, many materials have been selected for individual cases. However, in the field of recording on plain paper at a high rate to which the invention relates, there have not been conducted sufficient investigation yet.

Figure 4:
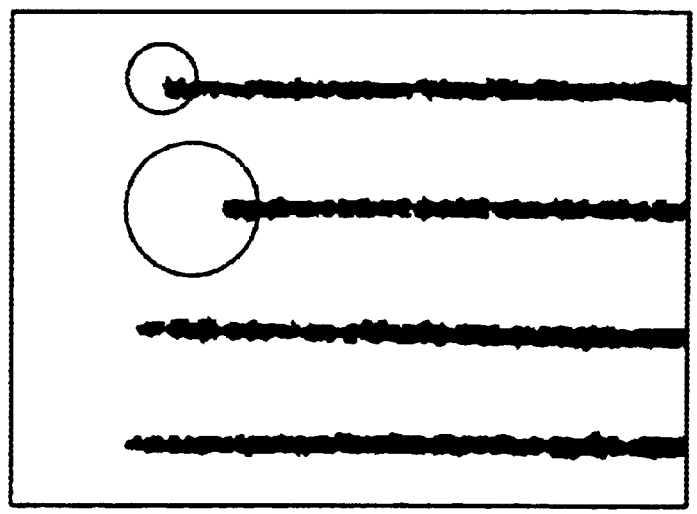
FIG. 4 shows results obtained by printing with a conventional ink composition.
Figure 5:
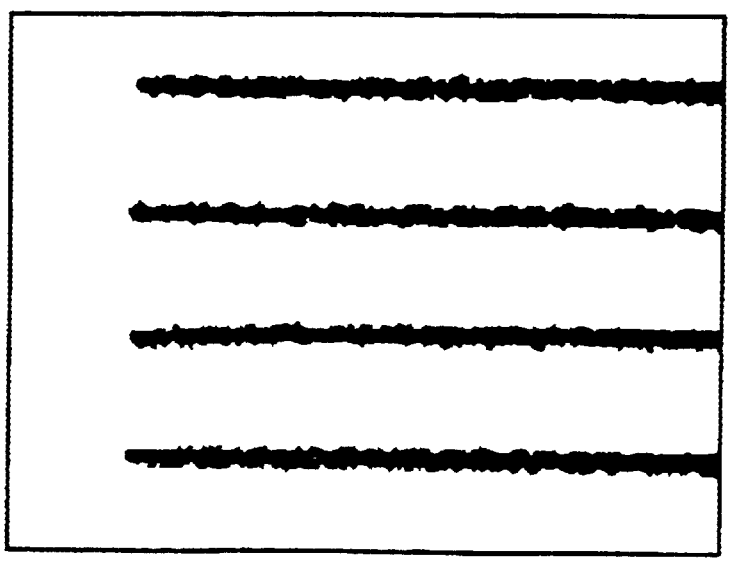
FIG. 5 shows results obtained by printing with an ink composition according to the invention.

FIG. 4 illustrates results obtained by printing with conventional inks, and FIG. 5 illustrates results obtained by printing with the ink compositions of the invention.

As a result of various investigations on the phenomenon that sufficient printing can not be attained due to delayed ejection of an ink immediately after initiation of printing and on the properties of an ink composition, the inventors have found that this phenomenon is deeply related to weight loss of the ink immediately after initiation of evaporation, and not related to the evaporation amount after leaving for a long time which has conventionally been regarded as a problem with wetting agents, thus having achieved the invention.

FIG. 1 is a graph showing the concept of the invention.

FIG. 1 shows weight losses, from 100%, of two kinds of ink compositions, in which curves 1 and 2 correspond to the ink of the invention and the conventional ink, respectively. It has so far been required for a wetting agent to keep, as its function, the remaining weight R2 after leaving for a long time (tb in FIG. 1) at a level higher than a certain level. However, this value does not relate to the phenomenon of delayed printing. In contrast, it has been found that, in case where weight loss ratio D at the point after a short time (ta in FIG. 1) is higher than a certain level, there markedly arises the phenomenon.

That is, mere admixture with an ordinary solvent having a high boiling point as has been conducted with conventional inks is ineffective for depressing initial evaporation (almost the same as the evaporation rate of a main solvent, e.g., water), and evaporation ratio is liable to become larger ($D_2$ in FIG. 1) than the intended level and, when added in an excess amount to depress evaporation, residual amount $R_2$ upon being left for a long time becomes unnecessarily much.

In contrast, the ink of the invention undergoes initial evaporation in a proper range ($D_1$ in FIG. 1), thus the unfavorable phenomenon being effectively depressed and the residual amount $R_1$ being lowered to a properly small level. That is, it must be noted that the invention is based on a standpoint absolutely different from conventional addition of a wetting agent. Specifically, in case where ta=30 minutes, then $5\% \leq D1 \leq 25\%(25°$ C., 60 RH %).

The invention also discloses kinds and optimal range of amounts to be added of compounds capable of attaining the objects of the invention.

Figure 2:
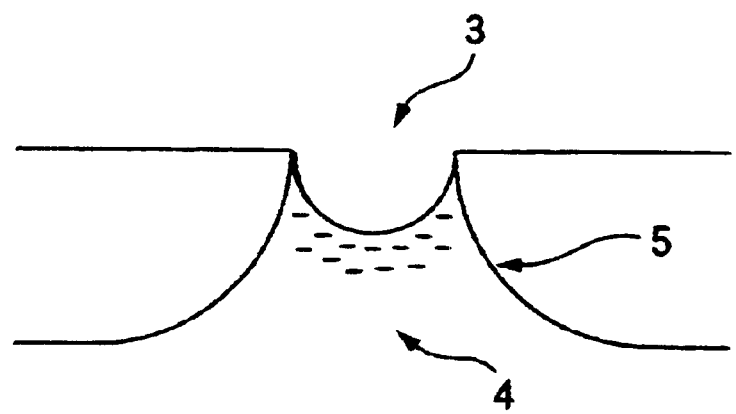
FIG. 2 is a cross sectional view of a nozzle showing the state of an ink adjacent thereto.

Additionally, the lower limit of $D_1$ is the level under which the residual amount of ink after a long time becomes too much. The reason why this phenomenon corelates with the weight loss ratio is not clear. However, for example, it may be considered that, as shown in FIG. 2, a slight amount of a highly volatile component (usually a main solvent such as water) of the ink composition evaporates at the portion in touch with the atmosphere existing around the opened nozzle to cause change such as an increase in viscosity of the ink, which might prevent ejection. Additionally, in FIG. 2, the reference numeral 3 designates cross section of a nozzle, 4 designates an ink in the head, and 5 designates a surface portion of the ink which portion have become highly thickened (or have undergone change in properties)

Figure 3:
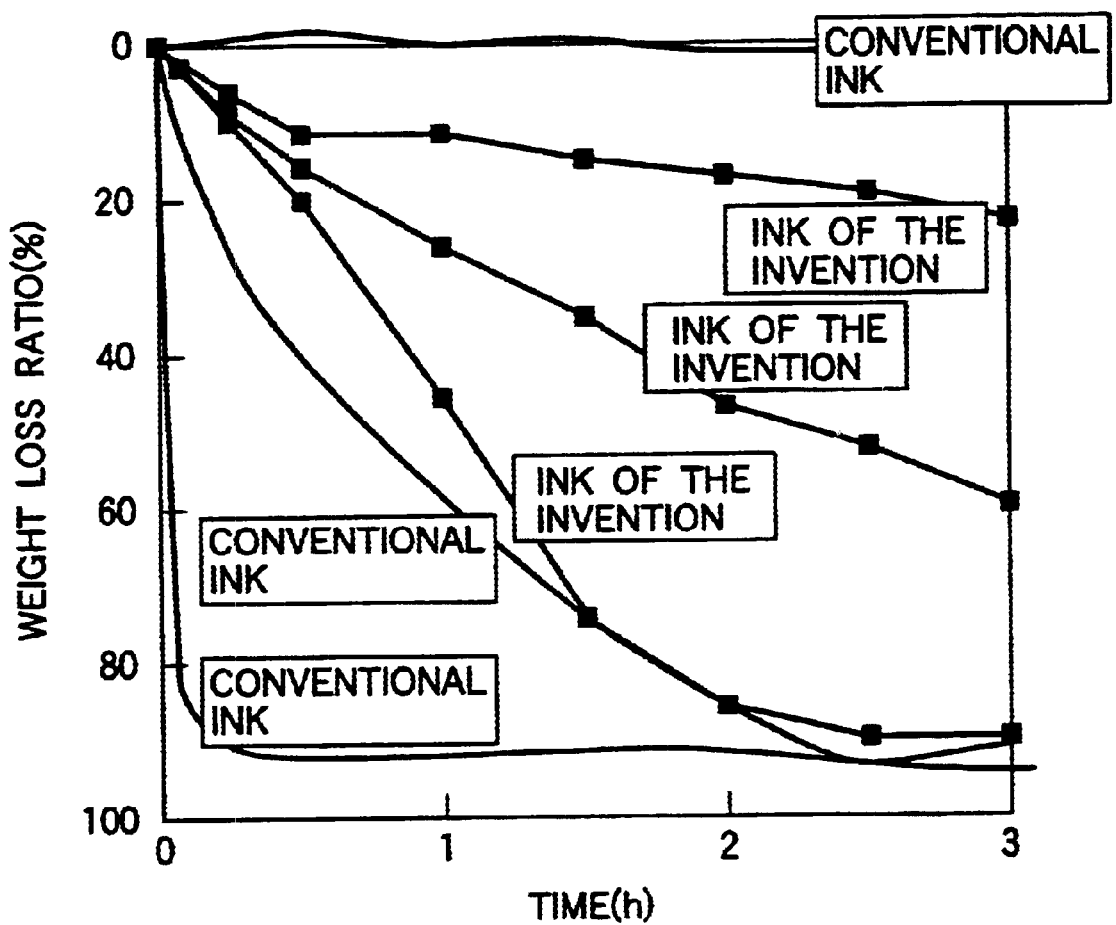
FIG. 3 is a graph showing the correlation between elapsed time and weight loss of each ink composition.

FIG. 3 shows the results of specific experiments using the ink compositions of the invention and conventional ones.

As has been described hereinbefore, it can clearly be seen that initial weight loss ratio of the ink composition of the invention is limited to a specific range different from those of the conventional inks.

The above description is summarized as follows. That is, the greatest feature of the inkjet ink composition of the invention is that it shows a weight loss ratio at 25° C./60 RH % in a state of mindlessness of 5 to 25% for 30 minutes based on the total weight of the ink. This weight loss ratio is an indication showing the drying properties of inks. In general, inks showing a larger weight loss ratio is more easily dried. However, inks showing a large weight loss ratio at an extremely early stage suffer condensation of solids due to vaporization of the medium component in the ink around a head, causing clogging of the nozzle and lacking ejection stability. Thus, the weight loss ratio at room temperature for 30 minutes is desirably 5 to 25% based on the total weight of the ink. If less than 5%, It takes too long for recorded ink to dry, which detriorates print quality in case where printing is conducted at a high speed on plain paper.

As a method for attaining the objects of the invention, there is illustrated a method of adjusting the ink composition to 5 to 15 mPa·s in viscosity at 25° C. and 30 to 55 mN/m in surface tension. (Poly)alkylene glycols such as polyethylene glycol or polyhydric alcohols such as glycerin show such a slow evaporation rate that they have conventionally been used as wetting agents. In the invention, however, it has been found that polyethylene glycol having an average molecular weight of 600 to 70000 is particularly preferred as the viscosity-adjusting agent and, further, as a thckening agent for an aqueous ink containing water as a major component.

The ink composition of the invention is not necessarily limited as to viscosity and surface tension Specifically, however, viscosity of less than 5 mPa·s makes it difficult to obtain suitable ink amount and dot diameter or high quality, whereas viscosity of more than 15 mPa·s makes it difficult to conduct inkjet recording with stability. In addition, as a result of investigations on the correlation between surface tension and printing quality with a number of ink compositions, the inventors have also found that there is a remarkable correlation between static surface tension and penetrating rate of the ink. That is, inks having a static surface tension at 25° C. of less than 30 mN/m tend to show an increased permeability with a decreased surface tension, thus causing backside oozing (oozing of the ink to backside of recording paper), whereas inks having a static surface tension of more than 55 mN/m are liable to cause transfer (stain at ink-touched portions), thus not being suited for high speed printing. Although the invention gives descriptions with respect to only static surface tension, it can be presumed that similar facts are observed also with respect to dynamic surface tension.

In the ink composition of the invention, various materials may be used without limitations. Generally, the ink composition is constituted by adding, to main materials of colorants and solvents, auxiliary agents such as binders, agents for adjusting physical properties such as viscosity, surface tension and pH, and antifungal agents In some cases, the solvents function also as anti-drying agents (wetting agents), penetrants (surface tension-decreasing agents) or agents for adjusting viscosity or evaporation rate as well as mere solvents. Materials showing various viscosities, surface tensions, solubilities, boiling points, evaporation rates or flash points may be used.

The ink composition of the present invention preferably comprises 7.5 to 40% by weight of polyethylene glycol having an average molecular weight of 600 to 6,000 as a thickening agent, based on the total weight of the non-pigment components (i.e., components other than pigment). Polyethylene glycol having an average molecular weight of less than 600 shows only a small effect of increasing viscosity of the major component, water and, if added till a good viscosity is obtained, fails to provide good printed products. In case when the added amount exceeds 40% by weight, the ink undergoes reduction in penetrating properties into a recording material and shows poor drying properties, thus print quality being deteriorated. Particularly preferred average molecular weight of the polyethylene glycol is 6000. Alternatively, the ink composition of the invention preferably comprises 1 to 10% by weight of polyethylene glycol having an average molecular weight of 20,000 to 70,000, based on the total weight of the non-pigment components. Polyethylene glycol having an average molecular weight of more than 70,000 increases viscosity of the ink so much that the amount of ejected ink decreases, resulting in decreased density of printed products.

For example, there may be used Polyethylene glycol 600, 1000, 1540, 2000, 4000, 6000, 20000 and 700000 (these being products of Wako Junnyaku K.K.), PEG#600 and PEG#6000 (these being Nihon Yushi K.K.).

The polyethylene glycols may be used alone or in combination of two or more of them.

Further, as another component for attaining the objects of the invention, glycol ethers are suited. Since glycol ethers generally have a low viscosity, and therefore have been added for the purpose of preventing a pen tip of ball-point pen or an inkjet nozzle from being dried. However, it is now found that viscosity of the ink can be adjusted to the level at which foaming force is small and a stable jet can be formed, by admixing with water and polyethylene glycol.

Specific examples of the glycol ethers include ethylene glycol ethers such as methyl glycol, methyl diglycol, methyl triglycol, methyl polyglycol, isopropyl glycol, butyl glycol, butyl diglycol, butyl triglycol, isoobutyl glycol isobutyl diglycol (these being products of Nihon Nyukazai K.K.) and propylene glycol ethers such as methyl propylene glycol, methyl propylene diglycol, methyl propylene diglycol, methyl propylene triglycol, propyl propylene glycol, propyl propylene diglycol, butyl propylene glycol, butyl propylene diglycol and phenyl propylene glycol (these being products of Nihon Nyukazai K.K.). These ethers are incorporated in a content of preferably 0 to 30% by weight based on the total weight of the non-pigment components If the content exceeds 30% by weight, there results a decreased surface tension, thus print quality being deteriorated.

Further, glycerin may be added in a content of 0 to 30% by weight based on the total weight of the non-pigment components for the purpose of improving ejection properties. If the content exceeds 30% by weight, printed products are liable to suffer blurring.

Water-soluble solvents may be added for improving characteristic properties.

For example, ketones such as acetone, methyl ethyl ketone and methyl isobutyl ketone, lower alcohols such as methanol, ethanol and isopropanol, glycols such as ethylene glycol, propylene glycol diethylene glycol and dipropylene glycol, acetates, thiodiglycol, and nitrogen-containing compounds such as N-methyl-2-pyrrolidone, 1,3-dimethylimidazoline and aminoalcohol may be used alone or as a mixed solvent.

The pigment for use in the invention preferably include those pigments which can be well dispersed in the above-described vehicles and show excellent weatherability. Coloring ability (color density per concentration of added pigment) of the pigments to be particularly used in the invention is not necesarily high and, in addition, production of a uniform fine particle dispersion of the pigments is difficult Hence, preparation of a highly concentrated dispersion of the pigment leads to the phenomenon that its melt viscosity increases too excessively. Thus, such pigments have not so far been practically used for inkjet inks. In the invention, organic or inorganic pigments of the following numbers described in Color Index may be used, though not limitative. Color tones of the pigments are properly selected depending upon kinds of printing such as full-color printing, spot (partial) color printing or multi-color printing.

As red or magenta pigments, there are illustrated Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, 88, Pigment Orange 13, 16, 20 and 36. As blue or cyan pigments, there are illustrated Pigment blue 1, 15, 15:1, 15:2, 15:3, 15:4, 15:6, 16, 17–1, 22, 27, 28, 29, 36 and 60. As green pigments, there are illustrated Pigment Green 7, 26, 36 and 50. As yellow pigments, there are illustrated Pigment Yellow 1, 3, 12, 13, 14, 17, 34, 35, 37, 55, 74, 81, 83, 93, 94, 95, 97, 108, 109, 10, 137, 138, 139, 153, 154, 155, 157, 166, 167, 168, 180, 185 and 193 and, as black pibments, there are illustrated Pigment Black 7, 28 and 26. These pigments may be selected to use depending upon the end-use of the inks.

To describe specific trade names, there may be illustrated, For example, Chromofine Yellow 2080, 5900, 5930, AF-1300, 2700L, Chromofine Orange 3700L, 6730, Chromofine Scarlet 6750, Chromofine Magenta 6880, 6886, 6891N, 6790, 6887, Chromofine Violet RE, Chromofine Red 6820, 6830, Chromofine Blue HS-3, 5187, 5108, 5197, 5085N, SR-5020, 5026, 5050, 4920, 4927, 4937, 4824, 4933GN-EP, 4940, 4973, 5205, 5208, 5214, 5221, 5000P, Chromofine Green 2GN, 2GO, 2G-550D, 5310, 5370, 6830, Chromofine Black A-1103, Seika Fast Yellow 10GH, A-3, 2035, 2054, 2200, 2270, 2300, 2400(B), 2500, 2600, ZAY-260, 2700(B), 2770, Seika Fast Red 8040, C405(F), CA120, LR-116, 1531B, 8060R, 1547, ZAW-262, 1537B, GY, 4R-4016, 3820, 3891, ZA-215, Seika Fast Carmin 6B1476T-7, 1483LT, 3840, 3870, Seika Fast Bordou 10B-430, Seika Light Rose R40, Seika Light Violet B800, 7805, Seika Fast Maroon 460N, Seika Fast Orange 900, 2900, Seika light BLue C718, A612, Cyanin Blue 4933M, 4933GN-EP, 4940, 4973 (these being products of DainitiSeika Kogyou K.K.), KET Yellow 401, 402, 403, 404, 405, 406, 416, 424, KET Orange 501, KET Red 301, 302, 303, 304, 305, 306, 307, 308, 309, 310, 336, 337, 338, 346, KET Blue 101, 102, 103, 104, 105, 106, 111, 118, 124, KET Green 201 (these being produces of Dai-nippon Ink Chemical Co., Ltd.), Colortex Yellow 301, 314, 315, 316, P-624, 314, U10GN, U3GN, UNN, UA-414, U263, Finecol Yellow T-13,T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, USN, Colortex Maroon 601, Cortex Brown B610N, Cortex Violet 600, Pigment Red 122, Colortex Blue 516, 517, 518, 519, A818, P-908, 510, Colortex Green 402, 403, Colortex Black 702, U905 (these being products of Sanyou Sikiso K.K.), Lionol Yellow 1405G, Lionol Blue FG7330, FG7350, FG7400G, FG7405G, ES, ESP-S (these being products of Toyo Ink Co., Ltd.), Toner Magenta E02, Permanent Rubin F6B, Toner Yellow HG, Permanent Yellow GG-02, Hostaapeam Blue B2G (these being products of Hoechist Industry), Carbon Black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44 and CF9 (these being products of Mitsubisi Chemical Co., Ltd.).

Also, dispersions previously prepared by dispersing pigments in water or a solvent may be used. For example, there may be illustrated MICROPIGMO WMBK-5, WMBE-5, WMRD-5, WMYW-5, AMBK-2, AMYW-2, AMBE-4 (these being products of Orient Kagaku K.K.), JA Black 25W, GA Black 2821, GA Yellow 1, GA Magenta 1, GA Cyan 2 (these being products of Mikuni Shikiso K.K.), BAB-O-JET200 and CAB-O-JET300 (these being products of Cabot Specialty Chemicals), with those in which pigments are dispersed in a concentration of as high as 10% by weight or more being particularly preferred.

The pigment is added in a proper concentration of 3 to 10% by weight. If the concentration is less than 3% by weight, there may result in deteriorated image quality whereas, if more than 10% by weight, there may result in detrimental influences on ink viscosity properties. Two or more of the colorants may properly be mixed to adjust color tone. In order to impart more functions to the ink composition of the invention, photo stabilizing agents, surface-treating agents, surfactants, viscosity-decreaasing agents, antioxidants, anti-aging agents, crosslinking accelerators, oxygen-absorbing agents, plasticizers, antiseptics, evaporation accelerators, pH-adjusting agents, anti-foaming agents, humectants, dispersing agents and dyes may be admixed.

In mixing or dispersing the vehicles pigments and other components, a stirrer, a beads mill or a homogenizer is optimal, but various well-known stirring, milling or dispersing apparatus may be used with no particular limitations.

As recording medium, papers having a sizing degree of 55 or less measured according to JIS P8122, "Method for testing Stöckigt sizing degree of paper".

For example, there may be illustrated woodfree paper or colored woodfree paper of 40 kg to 110 kg, recycled paper, copying paper or colored copying paper of 34 kg to 43 kg, OCR paper of 72 kg to 110 kg, carbonless paper or colored carbonless paper of 30 to 90 kg and synthetic papers such as Yupo 60, 80 110 micron, Yupo Coat 70 or 90 micron. In addition, there are further illustrated single-sided art paper of 68 kg, coated paper of 90 kg, foame mat paper of 70, 90 or 110 kg, foamed PET of 38 microns, Mituorikun (these being product of Kobayashi Recording Paper), OK woodfree paper, New OK woodfree paper, Sunflower, Phoenix, OK Royal White, woodfree paper for export (NPP, NCP, NWP or Royal White), OK book-grade paper, OK Cream book-grade paper, cream woodfree paper, OK map-grade paper, OK Isikari, Kyurei, OK Foam, OKH, NIP-N (these being products of Sin-oji Seishi K.K.), Kinnou, Toukou, woodfree paper for export, woodfree paper for special procurements, book-grade paper, book-grade paper L, slightly cream book-grade paper, paper for textbooks for primary school science, paper for continuous vouchers, woodfree NIP paper, Ginkan, Kinyou, Kinyou(W), Bridge, Capital, Kinkan Shoseki, Harp, Harp Cream, SK Color, paper for bills or bonds, Opera Cream, Opera, KYP Karte, Silvia HN, Excellent Foam (these being products of Nihon Seishi K.K.), Pearl, Kinryou, Usu Cream woodfree paper, paper for special books, paper for super-grade books, book-grade paper, Dia Foam (these being products of Mitsubishi Seishi K.K.), Kinnen V, Kinnen SW, Hakuzou, paper for high-grade publication, Cream Kinnen, Cream Hakuzou, paper for bills and bonds, paper for books, paper for maps, copying paper, HNF (these being products of Hokuetsu Seishi K.K.), Shiorai, paper for phone book cover, paper for books, Cream Shiorai, Cream Shiorai Middle Rough, Cream Shiorai Large Rough, DSK (these being products of Daishouwa Seishi K.K.), Sendai MP woodfree paper, Kinkou, Raichou Joshitsu, paper for hangings, square piece of fancy paper, paper for dictionaries, Cream Shoseki, White Shoseki, Cream woodfree paper, paper for maps, paper for continuous vouchers (these being products of Chuetsu Pulp Co. Ltd.), OP Kinnou (Chuetsu), Kinsa, paper for study-aid books, paper for exchange certificate (white), foamed printing paper (these being products of Kishu Seishi K.K.), Taiou, Socrates, paper for tie-on labels, paper for soft tickets, paper for paper with colored figures, Bright Foam (these being products of Daiou Seishi K.K.), Xerox 4024 and inkjet plain paper.

Preparation of a high-quality inkjet ink requires to well balance a lot of important factors. With the ink of the invention, such factors are so complicated and are not fully clarified in terms of numerical values. However, the ink of the invention satisfies several well-known requirements so as to be applied to inkjet printers. That is, this ink has enough stability at room temperature, and ensures reliable custody before printing and image quality after printing. After being deposited and hardened on a recording medium, it forms a uniform thin film having an enough transparency and saturation, thus producing printed products with good image quality. It is necessary that the printed products do not cause offset phenomenon in a piled state and that the ink composition shows a high safety with respect to environment and human body.

Further, this composition can be used for conventionally known inkjet printers in which ink droplets are ejected only when printing is required, such as office-use printers, printers for use in industrial marking, wide format printers, printers for making printing plates, label printers and all types of other high speed printers having the typical procedure. Since drying can be completed at a high rate, other recording media than the above-described papers, such as plastic films, capsules, gels, metal foils, glasses, woods and cloths may also be used. Since printing can be conducted in a non-contact manner, variously shaped media can be used, thus recording media not being limited only to these.

The present invention will be illustrated in greater detail with reference to the following Examples, but the invention should not be construed as being limited thereto.

EXAMPLE 1

A liquid containing 50% by weight of purified water, 40% by weight of polyethylene glycol (manufactured by Wako Junyaku K.K.; trade name: polyethylene glycol 600), 2% by weight of a surfactant (manufactured by Nihon Yushi K.K.; Unigly VKN5002) and 8% by weight of dipropylene glycol (manufactured by Wako Junyaku K.K.) was mixed with 30 parts by weight of a black pigment dispersion (manufactured by Cabot Specialty Chemicals Co.; CABO-JET300) per 100 parts by weight of the liquid. 300 g of the whole composition was dispersed in a homogenizer (made by Hitachi Koki K.K.; HG30) at 2,000 rpm till a homogeneous mixture was obtained, followed by filtering to remove impurities. Thus, there was obtained a homogeneous ink composition. Results are shown in Table 1.

TABLE 1

| Ink Composition | Example | | | | Comparative Example | |
|---|---|---|---|---|---|---|
| No. (parts by weight) | 1 | 2 | 3 | 4 | 1 | 2 |
| Purified water | 50 | 80 | 64 | 60 | | 70 |
| Polyethylene glycol 600 | 40 | | | | | 7 |
| PEG#6000 | | 7.5 | | | | |
| Polyethylene glycol 7000 | | | 1 | | | |
| Polyethylene glycol 20000 | | | | 10 | | |
| Unigly VKN 5002 | 2 | | | | | |
| Dipropylene glycol | 8 | | | | 45 | |
| Dipropylene glycol monomethyl ether | | 12.5 | | | 20 | |
| Diethylene glycol monobutyl ether | | | 5 | 30 | | |
| Ethylene glycol monoisobutyl ether | | | | | | 23 |
| Glycerin | | | 30 | | 35 | |
| CAB-O-JET300 | 30 | | | | | |
| GA Magental | | 20 | | | | |
| GA Yeloow1 | | | 20 | | | |
| GA Cyan2 | | | | 20 | 20 | 20 |
| C.I.Direct Yellow 86 | | | | | | |
| Weight loss ratio (%) in 30 min. | 5 | 25 | 6 | 10 | 4.6 | 26 |
| Viscosity (mPa · s) | 5 | 7.5 | 10 | 15 | 5 | 4 |
| Surface tension (mN/m) | 55 | 40 | 35 | 45 | 44 | 27 |
| Separation of pigment (%) | 0 | 0 | 0 | 0 | 0 | 0 |
| Jet stability (after leaving for 24 hours) | G | G | G | G | G | P |
| Water fastness | G | G | G | G | G | G |
| Shape of dots | G | G | G | G | P | — |
| Show through | G | G | G | G | P | — |
| Ink transfer | G | G | G | G | P | — |

Weight loss ratio of the ink composition was determined as follows. Two 50-μl droplets of the ink composition were formed on a glass plate using a micropipette, and were immediately weighed. After keeping for 30 minutes at 25° C./60 RH % in a state of windlessness, the ink composition was again weighed. Thus, weight loss ratio was calculated to be 5%.

Viscosity of the ink composition was measured at 25° C. using a rotational viscometer (made by Tokimec; Model EDL) to be 5 mPa·s. Surface tension was measured at room temperature using an automatic surface tensiometer (made by Kyowa Kaimen Kagakusha K.K.; Model CVBP-Z) to be 55 mN/m.

The ink composition was tightly closed in a 12-mm diameter test tube and left for 3 days at room temperature to observe separation of the pigment (separation degree being indicated in terms of %) No separation was observed.

This ink was charged in an inkjet printer (made by Hitachi Koki K.K.; Model: JOLT SJ01A), and it was confirmed that the ink was ejected through all of 96 nozzles and, after leaving for 24 hours at room temperature, the ink was again ejected to check the number of nozzles becoming unable to eject the ink. Thus, it was found that all of 96 nozzles ejected the ink with no problems, showing stable jetting even after being left for 24 hours.

Dot shapes printed on 55-kg paper and 90-kg paper were observed under a microscope, and almost spherical dots were scored "G", and dots with irregular shape "P". As to penetration to the backside (show through) and transfer, dots with good results were scored "G", and dots with poor results "P". As to water fastness, dots which underwent no change when dipped into city water immediately after printing were scored "G", and dots which underwent any dissolution of ink "P". The ink composition obtained in Example 1 was almost spherical and was evaluated as "G" with respect to shape, and was evaluated as "G" with respect to show through and ink transfer, and evaluated as "G" with respect to water fastness.

EXAMPLE 2

A liquid containing 80% by weight of purified water, 7.5% by weight of polyethylene glycol (manufactured by Nihon Yusi K.K.; trade name: PEG#6000), and 12.5% by weight of dipropylene glycol monomethyl ether (manufactured by Nihon Nyukazai K.K.) was mixed with 20 parts by weight, per 100 parts by weight of the liquid, of a magenta pigment dispersion (manufactured by Mikuni Sikiso K.K.; trade name: GA Magenta 1). Subsequent procedures were conducted in the same manner as in Example 1 to obtain a homogeneous ink composition.

Evaluation results obtained in the same manner as in Example 1 are shown in Table 1.

Weight loss ratio of the ink of this Example was 25%. Viscosity thereof at 25° C. was 7.5 mPa·s. Surface tension thereof was 40 mN/m at room temperature. Separation of the pigment was not observed. Jet stability was confirmed even after being left. Shape of dots, show through and water fastness were all evaluated as "G".

EXAMPLE 3

A liquid containing 64% by weight of purified water, 1% by weight of polyethylene glycol having an average molecular weight of 70000 (manufactured by Wako Junyaku K.K.; trade name: Polyethylene Glycol 70000), 5% by weight of diehylene glycol monobutyl ether (manufactured by Nihon Nyukazai K.K.; trade name: Butyl Diglycol) and 30% by weight of glycerin (manufactured by Wako Junyaku K.K.)

was mixed with 20 parts by weight, per 100 parts by weight of the liquid, of a yellow pigment dispersion (manufactured by Mikuni Sikiso K.K.; trade name: GA Yellow 1). Subsequent procedures were conducted in the same manner as in Example 1 to obtain a homogeneous ink composition.

Evaluation results obtained in the same manner as in Example 1 are shown in Table 1.

Weight loss ratio of the ink of this Example was 6%. Viscosity thereof at 25° C. was 10 mPa·s. Surface tension thereof was 30 mN/m at room temperature. Separation of the pigment was not observed. Jet stability was confirmed even after being left. Shape of dots, show through and water fastness were all evaluated as "G".

EXAMPLE 4

A liquid containing 60% by weight of purified water, 10% by weight of polyethylene glycol having an average molecular weight of 20000 (manufactured by Wako Junyaku K.K.; trade name: Polyethylene Glycol 20000) and 30% by weight of diehylene glycol monobutyl ether was mixed with 20 parts by weight, per 100 parts by weight of the liquid, of a cyan pigment dispersion (manufactured by Mikuni Sikiso K.K.; trade name: GA Cyan 2). Subsequent procedures were conducted in the same manner as in Example 1 to obtain a homogeneous ink composition.

Evaluation results obtained in the same manner as in Example 1 are shown in Table 1.

Weight loss ratio of the ink of this Example was 10%. Viscosity thereof at 25° C. was 15 mPa·s. Surface tension thereof was 45 mN/m at room temperature. Separation of the pigment was not observed. Jet stability was confirmed even after being left. Shape of dots, show through and water fastness were all evaluated as "G".

COMPARATIVE EXAMPLE 1

A liquid containing 45% by weight of dipolyethylene glycol, 35% by weight of glycerin and 20% by weight of dipropylene glycol monobutyl ether was mixed with 20 parts by weight, per 100 parts by weight of the liquid, of GA Cyan 2 as a pigment. Subsequent procedures were conducted in the same manner as in Example 1 to obtain a homogeneous ink composition Evaluation results obtained in the same manner as in Example 1 are shown in Table 1.

Weight loss ratio of the ink of this Comparative Example was 4.6%. Viscosity thereof at 25° C. was 5 mPa·s. Surface tension thereof was 44 mN/m at room temperature. Separation of the pigment was not observed. Jet stability was confirmed even after being left. However, shape of dots were evaluated as "P", show through as "P", ink transfer as "P", and water fastness as "G".

COMPARATIVE EXAMPLE 2

A liquid containing 70% by weight of purified water, 7% by weight of polyethylene glycol 600, and 23% by weight of ethylene glycol monoisobutyl ether (manufactured by Wako Junyaku K.K.) was mixed with 20 parts by weight, per 100 parts by weight of the liquid, of GA Cyan 2 as a pigment. Subsequent procedures were conducted in the same manner as in Example 1 to obtain a homogeneous ink composition.

Evaluation results obtained in the same manner as in Example 1 are shown in Table 1.

Weight loss ratio of the ink of this Comparative Example was 26%. Viscosity thereof at 25° C. was 4 mPa·s. Surface tension thereof was 27 mN/m at room temperature. Separation of the pigment was not observed. The nozzles were dried after leaving for 24 hours, and ejection of the ink was unstable.

The ink composition of the invention for inkjet printers can improve rapid drying properties and storage stability of the ink which have been problematical with conventional aqueous inks. Further, since pigments are used as colorants, both colorant dispersion stability and ejection properties are intended to be improved at the same time, and the ink can provide such properties. In addition, the ink has better weatherability than those which contain dyes as a major colorant, and enables production of an ink permitting high speed printing and low cost production, thus finding wide applications.

Although the invention has been described in detail and with reference to specific examples thereof, it will be apparent to one skilled in the art that various changes and modifications can be made therein without departing from the spirit and scope thereof.

What is claimed is:

1. An ink composition for use in an on-demand inkjet printer capable of printing on plain paper at a recording rate of 10 ips or higher, which ink composition comprises at least a pigment and non-pigment components including at least water and a thickening agent and shows a weight loss ratio at 25° C. and 60 RH (relative humidity) % for 30 minutes of 5 to 25% based on the total weight of the ink.

2. The ink composition as claimed in claim 1, wherein said non-pigment components comprises:

at least one of 7.5 to 40% by weight of a polyethylene glycol having an average molecular weight of 600 to 6,000 and 1 to 10% by weight of a polyethylene glycol having an average molecular weight of 20,000 to 70,000 as a thickening agent;

0 to 30% by weight of at least one of an ethylene glycol ether and a propylene glycol ether; and 0 to 30% by weight of glycerin.

3. The ink composition as claimed in claim 1, having a viscosity at 25° C. of 5 to 15 mPa·s and a surface tension of 30 to 55 mN/m.

4. An on-demand inkjet recording process comprising:

recording an image on plain paper by ejecting an ink composition at a recording rate of 10 ips or higher, wherein said ink composition is as claimed in claim 1.

5. The process as claimed in claim 4, wherein said non-pigment components, comprise:

at least one of 7.5 to 40% by weight of a polyethylene glycol having an average molecular weight of 600 to 6,000 and 1 to 10% by weight of a polyethylene glycol having an average molecular weight of 20,000 to 70,000 as a thickening agent;

0 to 30% by weight of at least one of an ethylene glycol ether and a propylene glycol ether; and 0 to 30% by weight of glycerin.

6. The process as claimed in claim 4, wherein said ink composition has a viscosity at 25° C. of 5 to 15 mPa·s and a surface tension of 30 to 55 mN/m.

7. The process as claimed in claim 4, wherein said plain paper has a Stöckigt sizing degree of 55 or less.

8. An ink composition for use in an on-demand inkjet printer capable of printing on plain paper at a recording rate of 10 ips or higher, said ink composition, comprising:

at least a pigment and non-pigment components, said non-pigment components including at least water and a thickening agent, wherein said ink composition shows a weight loss ratio, based on a total initial weight of said ink composition, of 5 to 25%, for 30 minutes at 25° C. and 60% RH (relative humidity) and, wherein said non-pigment components comprise:
- at least one of 7.5 to 40% by weight of a polyethylene glycol having an average molecular weight of 600 to 6,000 and 1 to 10% by weight of a polyethylene glycol having an average molecular weight of 20,000 to 70,000 as a thickening agent;
- 0 to 30% by weight of at least one of an ethylene glycol ether and a propylene glycol ether; and
- 0 to 30% by weight of glycerin.

9. The ink composition as claimed in claim 8, having a viscosity of 5 to 15 mPa·s and a surface tension of 30 to 55 mN/m at 25° C.

10. An on-demand inkjet recording process comprising:
recording an image on plain paper by ejecting an ink composition at a recording rate of 10 ips or higher,
wherein said ink composition is as claimed in claim 1, and
wherein said non-pigment components, comprise:
- at least one of 7.5 to 40% by weight of a polyethylene glycol having an average molecular weight of 600 to 6,000 and 1 to 10% by weight of a polyethylene glycol having an average molecular weight of 20,000 to 70,000 as a thickening agent;
- 0 to 30% by weight of at least one of an ethylene glycol ether and a propylene glycol ether; and
- 0 to 30% by weight of glycerin.

11. The process as claimed in claim 10, wherein said ink composition has a viscosity of 5 to 15 mPa·s and a surface tension of 30 to 55 mN/m at 25° C.

12. The process as claimed in claim 10, wherein said plain paper has a Stöckigt sizing degree of 55 or less.

13. The ink composition as claimed in claim 1, wherein said non-pigment components include at least one of 7.5 to 40% by weight of a polyethylene glycol having an average molecular weight of 600 to 6,000 and 1 to 10% by weight of a polyethylene glycol having an average molecular weight of 20,000 to 70,000 as a thickening agent.

14. The ink composition as claimed in claim 1, wherein said non-pigment components include 0 to 30% by weight of at least one of an ethylene glycol ether and a propylene glycol ether.

15. The ink composition as claimed in claim 1, wherein said non-pigment components include 0 to 30% by weight of glycerin.

16. The process as claimed in claim 4, wherein said non-pigment components include at least one of 7.5 to 40% by weight of a polyethylene glycol having an average molecular weight of 600 to 6,000 and 1 to 10% by weight of a polyethylene glycol having an average molecular weight of 20,000 to 70,000 as a thickening agent.

17. The process as claimed in claim 4, wherein said non-pigment components include 0 to 30% by weight of at least one of an ethylene glycol ether and a propylene glycol ether.

18. The process as claimed in claim 4, wherein said non-pigment components include 0 to 30% by weight of glycerin.

* * * * *